United States Patent [19]
Benson

[11] Patent Number: 5,131,165
[45] Date of Patent: Jul. 21, 1992

[54] COMPUTERIZED DEPTH CALCULATOR

[76] Inventor: Richard T. Benson, 2129 Lindenwood Ave., East Moline, Ill. 61244

[21] Appl. No.: 654,279

[22] Filed: Feb. 21, 1991

[51] Int. Cl.⁵ .................... G01B 7/26; A01K 91/20
[52] U.S. Cl. ......................... 33/719; 33/716; 33/1 N; 43/4; 43/25
[58] Field of Search ............ 33/719, 713, 720, 716, 33/1 CC, 1 N; 43/25, 27.2, 4

[56] References Cited

U.S. PATENT DOCUMENTS

| | | | |
|---|---|---|---|
| 2,669,785 | 2/1954 | Rydzewski | 33/719 |
| 3,149,419 | 9/1964 | Koznarski | 33/713 |
| 3,874,108 | 4/1975 | Connor | 33/720 |
| 3,959,885 | 6/1976 | Edmiston | 43/25 |
| 4,249,314 | 2/1981 | Beck | 33/1 CC |
| 4,382,336 | 5/1983 | Call | 43/25 |
| 4,586,286 | 5/1986 | Cheatham, Jr. | 33/720 |
| 4,620,371 | 11/1986 | Murakami et al. | 33/719 |
| 4,697,758 | 10/1987 | Hirose et al. | 33/716 |
| 4,752,878 | 6/1988 | Sigurdsson et al. | 43/4 |
| 4,793,088 | 12/1988 | Fortuna | 43/4 |
| 4,899,480 | 2/1990 | Park | 43/4 |
| 4,907,347 | 3/1990 | Pease | 33/720 |

Primary Examiner—William A. Cuchlinski, Jr.
Assistant Examiner—Alvin Wirthlin

[57] ABSTRACT

A depth calculating device is provided wherein the exact depth of a fisherman's bait presentation is calculated while that fisherman is trolling. The invention utilizes an electronic sensing device which determines the deflection of the fishing line away from the line formed between the tip of the fishing pole and the water's bottom. An additional electronic sensing device measures the length of line played out from the reel. Both measurements are processed by a central processing unit which in conjunction with the cosine function stored in the memory of the central processing unit then calculates and displays the exact depth of the bait presentation at any given moment.

5 Claims, 2 Drawing Sheets

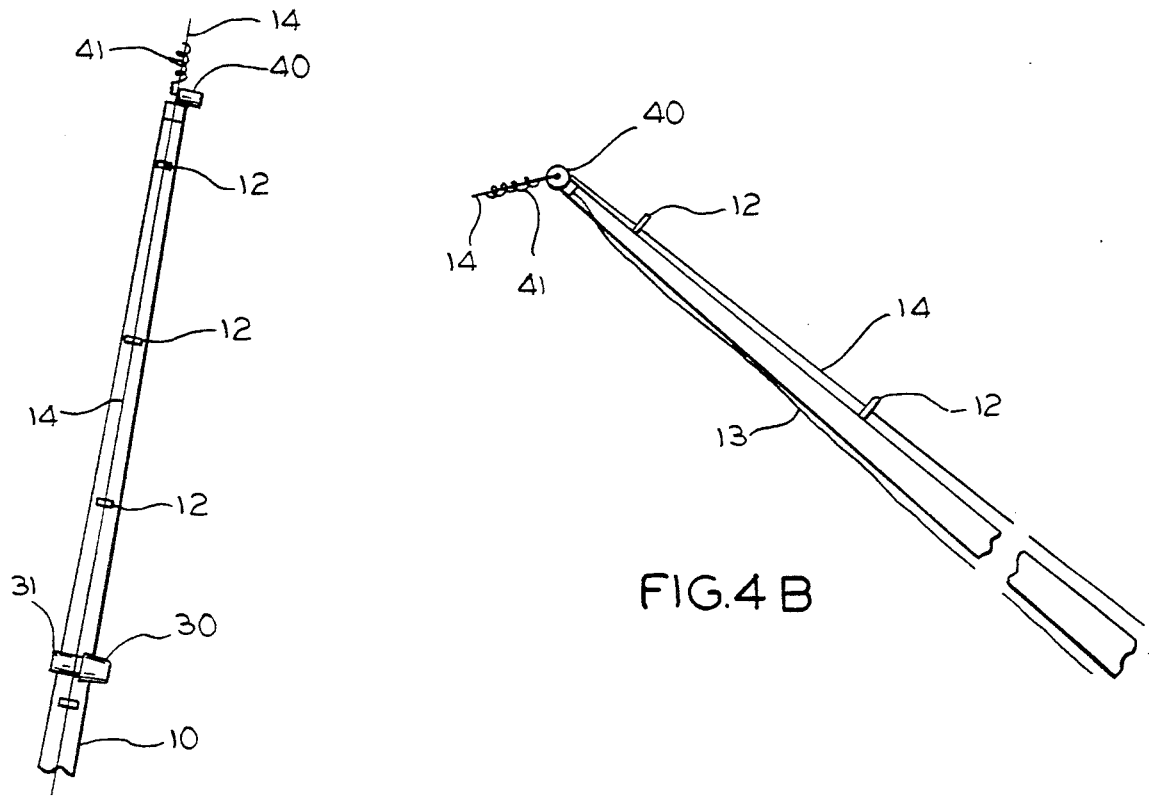
FIG. 4A
FIG. 4B
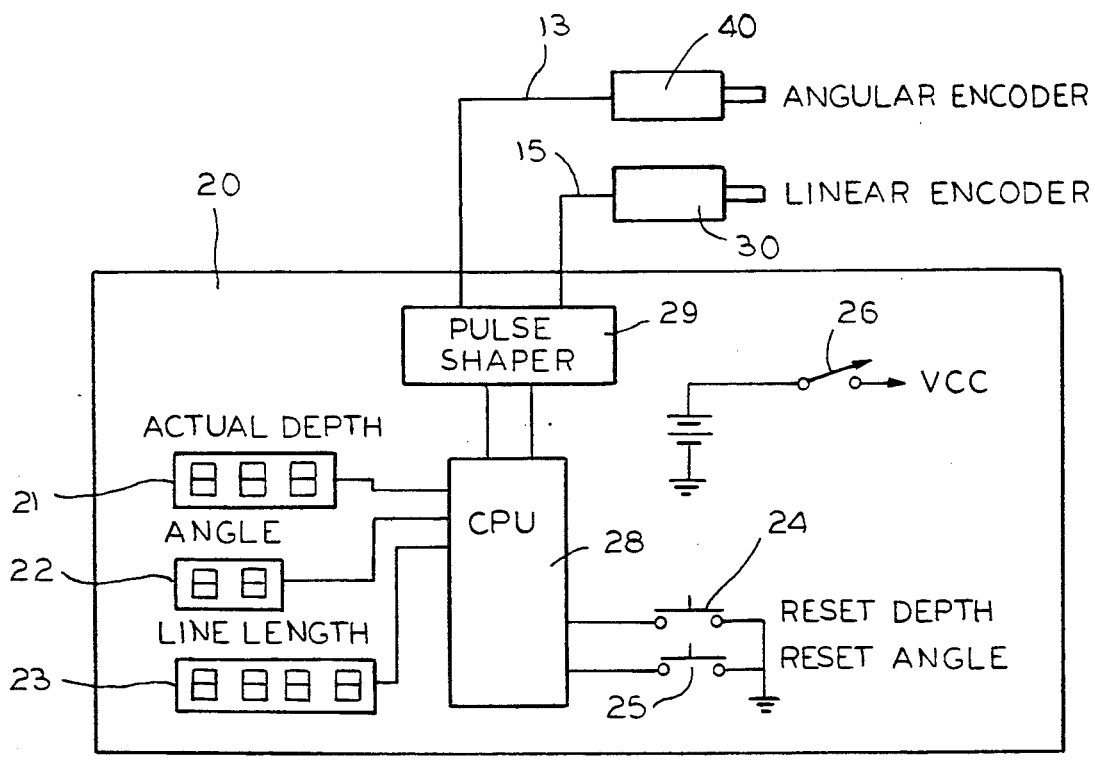
FIG. 5

COMPUTERIZED DEPTH CALCULATOR

BACKGROUND OF THE INVENTION

This invention relates to an accurate method for calculating the depth of a fishing bait presentation and a device for accomplishing that purpose.

Fishermen currently use electronic fish finders and electronic depth finders which show the location of schools of fish. Such devices use a sounding and sensing device fixed to the hull of the boat which emits any of a variety of wave forms and the reflection of such wave form is then sensed by the hull mounted sensing probe. The depth of the water that the boat is passing over is calculated based upon that reflection. Such devices are also capable by virtue of their resolution to determine if the solid object being sensed is true bottom or is actually a fish or school of fish. The results of such measurements are often visually displayed on a monitor inside the boat so that the fisherman can see a representation of the water's bottom and the actual depth where the fish are located.

Heretofore, however, the fisherman was unable to know where his bait presentation was in relation with the fish that he saw on his depth monitor and was only able to approximate his bait presentation in relation to the fish, and was further unable to re-position that line quickly so that the bait presentation was near the fish. Fishermen have heretofore used some sort of down rigger device for trolling behind the boat which device is merely a heavily weighted line played out at a predetermined depth through which the fishing line runs so that as the boat moves the downrigging would force the fishing line to trail behind the down rigging device at that predetermined depth. Such a device is difficult to rig and impossible to adjust quickly.

Devices have previously been designed which use a trigonometric function such as the device of Connor, U.S. Pat. No. 3,874,108. Such devices were cumbersome to read accurately and maintain and were not easily adjustable so that the fisherman could respond quickly to the conditions he observed on his fish finder device.

SUMMARY OF THE INVENTION

Accordingly, one object of the invention is to provide a quick, accurate and easily useable method for calculating the depth at which the fishing line and bait presentations is running. A further object is to provide a means whereby the depth of that fishing bait presentation can be readily altered so as to take advantage of, as instantaneously as possible, the changed conditions that a fisherman observes while fishing. Further objects of the inventive device will become apparent from the drawing and preferred embodiment described herein.

BRIEF DESCRIPTION OF THE DRAWINGS

FIG. 4A is a top perspective view of the device showing the angle encoder and the line encoder.

FIG. 4B is a side perspective view of the device on a filing pole showing the line measuring encoder, the electrical cable running the length of the pole, and the angle encoder.

FIG. 5 is a schematic diagram of the read-out device.

DETAILED DESCRIPTIONS OF THE PREFERRED EMBODIMENT

Figure 1:
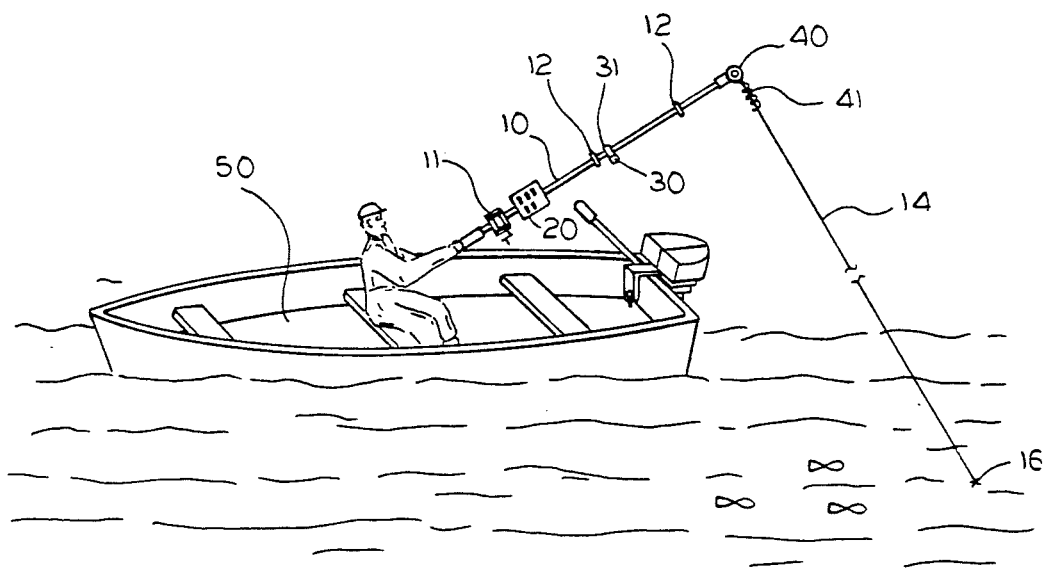
FIG. 1 is a perspective view of the device as used from a boat showing an angle encoder device which measures line deflection at the tip of the pole, a line measurement encoder near the mid-point of the pole and a processor unit located near the grip of the pole which outputs the depth at which the bait is located.

Referring to FIG. 1 which illustrates the method by which the device may be used by a fisherman located in a boat 50, the fishing rod 10 and reel 11 are augmented by the addition of an electronic line encoder 30 located on the length of the rod 10 and across which line encoder 30 the fishing line 14 travels as it plays off of the reel 11 and as the line 14 passes through the line guides 12. The shaft 31 of line encoder 30 rotates about the central axis of the encoder as the line passes over said shaft 31 with such rotation being caused by the movement of fishing line 14 over the outer surface of the shaft of encoder 30. Such rotation is then converted to an electronic signal and transmitted via interconnecting cabling to a central processing unit 20 located near the grip of the rod 10. A further measurement is made by the angle encoder 40 as the line 14 plays off of the rod 10 which measurement is of the angle at which that line 14, or hypotenuse is deflecting away from the side adjacent or plane formed by the tip of the rod and the true bottom located below the boat 50. Such angle is measured by the deflection of angle encoder arm 41 through which line 14 passes with such deflection being electronically encoded by the encoder 40 and the electronic signal produced thereby being transmitted to the central processing unit 20 via cabling connecting the two. With both measurements, the central processing unit 20 is able to calculate the actual depth at which the bait presentation 16 is located.

Figure 2:
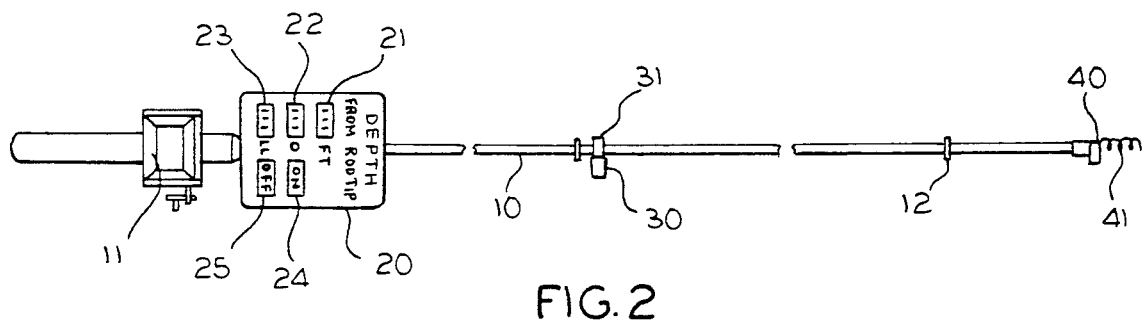
FIG. 2 is a top perspective plan view of the device as incorporated on the fishing pole.

FIG. 2 is a top plan view of the device shown in FIG. 1 showing the positional interrelationship between the rod 10 and reel 11, the central processing unit 20 with read-outs thereon of actual depth 21 of the bait, angle of deflection 22, line length 23 as well as depth reset button 24 and angle reset button 25. FIG. 2 also shows the positional interrelationships of line encoder 30 and angle encoder 40.

Figure 3:
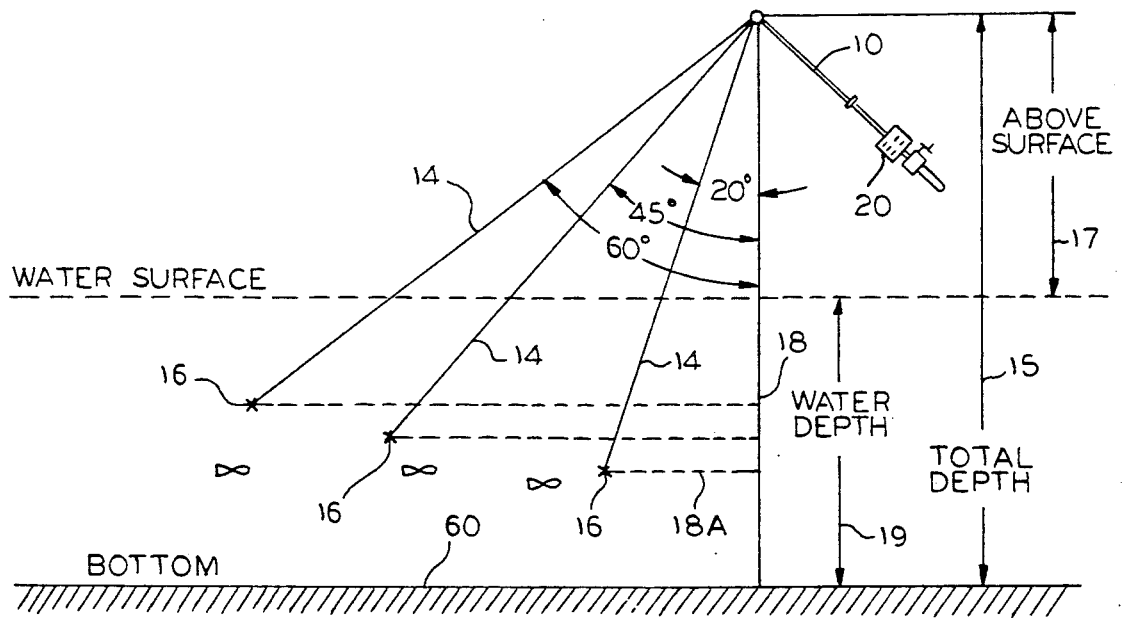
FIG. 3 is a plan view of the device showing the calculation procedures based upon a variety of angles that the fishing line or hypotenuse makes relative to the side adjacent or plane formed by the tip of the fishing pole and the water's bottom.

FIG. 3 demonstrates the method by which the depth of the bait presentation 16 is calculated. By measuring the one then knows the length of a hypotenuse of a right triangle. A second leg of such triangle is the line 18, extending between the rod 10 tip and the true bottom of the body of water directly below the rod 10 tip. The third leg is the line 18a extending between the bait 16 on the end of the fishing line 14 and the intersection of line 18 where a right angle is created. By measuring the three corresponding angles formed by line 14 with the plane 18 between rod 10 tip and depth of fish, one can use the corresponding cosine function for such angle which is then multiplied by the corresponding line 14 length to determine depth which may be shown for illustrative purposes as follows:

| Line Set Out 14 | Angle | Corresponding Cosine | Actual Fish or Target Depth 16 |
| --- | --- | --- | --- |
| 80.00 Feet | 20° | 0.93969 | 75.18 Feet |
| 60.00 Feet | 45° | 0.70711 | 42.43 Feet |
| 40.00 Feet | 60° | 0.5000 | 20.00 Feet |

The central processing unit 20 of the device may be preprogrammed by the user who can insert the length of the rod tip 17 above the water so that the measurement can be subtracted away from the actual fish or target depth calculated by the device so that the measurements of the depth finder mounted to the hull of the boat and the computerized depth finding device are equivalent shown here as the depth 15 less the depth 17 to produce a true depth 19.

The device is shown in greater detail in FIG. 4A wherein the fishing line 14 passes over the shaft 31 of line encoder 30 as it is deployed along rod 10 and through line guides 12 and passes through angle encoder 40 and angle line arm 41. Such interrelationships may be better understood from FIG. 4B which is a side view of the device and which shows the electronic cable 13 running on the lower surface of Rod 10 thereby connecting angle encoder 40 to the central processing unit 20. Such lower surface also serves to provide a cable run for the cable 15 which connects line encoder 30 to central processing unit 20 as shown in FIG. 5. Also shown in FIG. 4B is the relationship of line 14 to angle line arm 41 through which line 14 passes. The deflection of such arm 41 is measured by encoder 40. Encoders 30 and 40 are commonly available from manufactures such as the MRE 012 Series of Micro Incremental Encoders manufactured by Seiko Epson America, Inc.

FIG. 5 is a schematic representation of the inventive device showing input from the angle encoder 40 via cable 13 and line encoder 30 via cable 15 coming into the central processing unit 20 and connected to a pulse shaper 29 which processes the electronic signal into a format that can readily be accepted by the CPU 28. CPU 28 is pre-programmed with the full range of cosine functions and uses the information from encoders 30 and 40 to perform the calculation and ultimately display the calculated actual depth which is shown on a digital read-out at 21. CPU 28 also transmits the measured angle which is displayed on a digital read-out 22 and the fishing line length which is displayed on a digital read-out at 23. The central processing unit 20 may be activated by switch 26 and the measured valves may be reset by switches 24 and 25.

The central processing unit may also be programmed to provide an automatic subtraction of distance between the tip of the rod and the water's surface so that the fisherman is comparing the depth of fish in the water from his fish finder with depth of bait in the water as calculated by the inventive device.

While the above preferred embodiment has been described using specific examples of electronic encoders and specific examples of application such description is illustrative only, and it is to be understood that changes and variations may be made to both without departing from the spirit or scope of the inventive device, method and claims.

I claim:

1. A computerized depth calculator device for instantaneously calculating the depth of a bait presentation at the end of a fishing line, said device including:
   (a) a fishing rod;
   (b) means for measuring the length of a line played out from the device and converting such measurement into a first electronic signal; and
   (c) means for measuring the angular deflection of a line played out from the device away from a line formed between the tip of the fishing rod and the true bottom of a body of water directly below such tip and converting a measurement taken by said angular measuring means into a second electronic signal; and
   (d) processing means for receiving said first and second electronic signals and for converting such signals into said depth of bait presentation; and an electronic numerical display means for displaying said depth from moment to moment on a real time basis.

2. The device of claim 1 wherein the means for measuring the length of a line is an encoder which translates movement of line across an axis into an electronic signal.

3. The device of claim 1 wherein the means for measuring the angular deflection is an encoder which translates the deflection of said fishing line away from said line between the tip of the rod and the true bottom of a body of water and for converting such measurement into said second electronic signal.

4. The device of claim 1 wherein the processing means for receiving electronic signals is a central processing unit which has been pre-programmed to multiply the cosine function for the measured angular deflection by the measured line length to arrive at a calculated depth.

5. The device of claim 1 wherein the numerical display consists of an electronic display which shows the calculated end of the line and depth of the bait in a unit of measurement and which display varies according to the calculation.

* * * * *